3,034,920
COATING SYNTHETIC RESIN FILM WITH COPOLYESTER RESIN INK
Richard C. Waller, Cuyahoga Falls, Ohio, and Marcia C. Shaffer, Marlton, N.J., assignors to The Goodyear Tire & Rubber Company, Akron, Ohio, a corporation of Ohio
No Drawing. Filed Dec. 30, 1957, Ser. No. 705,739
8 Claims. (Cl. 117—38)

This invention relates to printing inks for films of high molecular weight linear polymers.

High strength films suitable for commercial applications are generally high melting, highly crystalline, insoluble materials. Presently available printing inks do not adhere satisfactorily to such films, and, consequently, it has been difficult to letter or decorate the films.

In order to improve the attractiveness of wrappings and bags made of films and to promote the salability and identification of wrapped articles, it is desirable to print adherent characters and designs on the films used as wrappings. For the printing, it is desirable to use an ink which is capable of producing more or less permanent designs of attractive and pleasing appearance.

It is an object of this invention to provide printing inks having improved adhesion. It is another object of this invention to provide an ink which is particularly suitable for printing characters and designs on films of various types such as unoriented, amorphous, oriented and cold drawn or cold worked films. It is another object to provide an ink for printing which forms strong, tough, adherent characters and designs on films. Still another object is to provide an ink which produces designs and decorations of attractive and pleasing appearance. Other objects will appear hereinafter as the description of the invention proceeds.

The invention consists broadly in the production of printing inks having a vehicle comprising an ethylene terephthalate-ethylene isophthalate copolyester. These polyesters are readily prepared by the ester interchange method in which esters of terephthalic and isophthalic acids are reacted with a glycol to form the diglycol esters of the acids or a low molecular weight polymeric ester which is then polymerized to a high molecular weight polymeric polyester by a condensation reaction with splitting out of the glycol. The di lower alkyl esters such as dimethyl or diethyl esters of terephthalic acid and isophthalic acid are preferred starting materials. The following example illustrates the preparation of a 75/25 ethylene terephthalate-ethylene isophthalate copolyester suitable for use in the invention using dimethyl terephthalate and dimethyl isophthalate as starting materials for forming the copolyester.

*Example 1*

Eleven parts of ethylene glycol and 11.0 parts of a 75/25 mixture of dimethyl terephthalate and dimethyl isophthalate to which 0.0033 part (based on the total weight of dimethyl terephthalate and dimethyl isophthalate) of titanium tetrafluoride had been added were placed in a glass tube having an inside diameter of 25 millimeters. The mixture of polyester-forming reactants was heated to 197° C. under nitrogen gas at atmospheric pressure. A slow stream of nitrogen was passed through the mixture at the rate of approximately 100 bubbles per minute. Stirring was accomplished by mechanically rotating the nitrogen inlet tube which was fitted with three pairs of blades. The alcoholysis was carried substantially to completion as determined by the recovery of approximately 90% of the calculated amount of methanol. The time required for the alcoholysis reaction was five hours. At the conclusion of the alcoholysis the pressure was gradually reduced to 0.1 millimeter of mercury and the unreacted glycol distilled off. The pressure was maintained at 1.0 millimeter of mercury by controlling the rate of flow of nitrogen into the evacuated system. After 1.5 hours of condensation at 260° C. and an absolute pressure of 1 millimeter of mercury, a 75/25 ethylene terephthalate-ethylene isophthalate copolymer having a melt viscosity at 280° C. of 11,230 poises was obtained. Copolyesters having other ethylene terephthalate-ethylene isophthalate ratios such as 70/30, 65/35, 60/40, and various other ratios can be similarly prepared by suitably adjusting the terephthalate isophthalate ratio in the reaction mixture.

The ink of this invention comprises as the essential ingredients a solution of a soluble ethylene terephthalate-ethylene isophthalate copolyester and a coloring material, such as a dye or pigment. Also included in the ink may be waxes, plasticizers and other ink-compounding ingredients. Suitable solvents for the copolyesters include tetrachloroethane, dioxane, acetophenone, chloroform and nitrobenzene.

The following example illustrates the practice of the invention using a 60/40 ethylene terephthalate-ethylene isophthalate copolyester as the vehicle.

*Example 2*

One hundred and twenty grams of a 60/40 ethylene terephthalate-ethylene isophthalate copolyester were dissolved in 680 grams of tetrachloroethane, and 480 grams of titanium dioxide were added to the solution, and the mixture was agitated until the titanium dioxide was thoroughly dispersed. A piece of polyethylene terephthalate film was coated or printed in a selected area with the mixture, and the thus-printed film was dried. The printing adhered tightly to the polyethylene terephthalate film, was flexible and had excellent resistance to scratching and abrasion.

A printed area of a regular commercial ink on polyethylene terephthalate film was easily scratched and abraded and had poor adhesion to the polyethylene terephthalate. The commercial ink was generally unsuitable for printing permanent designs and patterns on the polyester film.

The invention has been illustrated with particular respect to printing on polyethylene terephthalate with an ink made with a 60/40 ethylene terephthalate-ethylene isophthalate copolyester, which is preferred in the practice of the invention. Other similar copolyesters can be used, such as the copolyesters in which the ethylene terephthalate units comprise from 75 to 30% of the sum of the ethylene terephthalate and ethylene isophthalate units in the copolyester and the ethylene isophthalate units comprise correspondingly from 25 to 70% of the sum of the ethylene terephthalate and ethylene isophthalate units. The preferred copolyesters are the copolyesters in which the ethylene terephthalate units comprise from 75 to 50% of the sum of the ethylene terephthalate and ethylene isophthalate units in the copolyester and the ethylene isophthalate units correspondingly comprise from 25 to 50% of said sum. These copolyesters can be prepared by methods similar to Example 1, varying the ratio of terephthalate and isophthalate reactants, as described in copending application Serial No. 413,722, filed March 2, 1954, now U.S. Patent No. 2,965,613. Various coloring materials, dyes or pigments can be used, the selection depending on the particular color desired and the conditions of use of the film. The inks can be used to coat the entire surface of a film as well as to print in a selected area.

The invention has been illustrated with particular respect to coating or printing polyethylene terephthalate film. Other films can be used in the place of polyethylene terephthalate film. Representative examples of such films are vinyl chloride polymer films, cellophane and polyester films. The ink is particularly useful with films of polyethylene terephthalate or polyethylene isophthalate or polyethylene terephthalate - isophthalate copolyesters. The preferred ethylene terephthalate-ethylene isophthalate copolyester films are films of copolyesters in which the ethylene terephthalate units comprise from 90 to 50% of the sum of the ethylene terephthalate and ethylene isophthalate units in the copolyester and the ethylene isophthalate units correspondingly comprise from 10 to 50% of said sum. The film can be amorphous, crystalline or oriented. The inks of the invention can also be used to coat in decorative colors or patterns as well as to print on structures such as molded or machined articles or masses of vinyl chloride, polyester resin and cellophane as well as on films.

While certain representative embodiments and details have been shown for the purpose of illustrating the invention, it will be apparent to those skilled in this art that various changes and modifications may be made therein without departing from the spirit or scope of the invention.

We claim:

1. A printing ink comprising a random ethylene terephthalate-ethylene isophthalate copolyester in which the ethylene terephthalate units comprise from 75 to 30% of the sum of the ethylene terephthalate units in the copolyester and the ethylene isophthalate units correspondingly comprise from 25 to 70% of said sum, a solvent for said copolyester and a coloring material selected from the group consisting of dyes and pigments.

2. A composite article comprising a film base and an adhered layer comprising a random ethylene terephthalate-ethylene isophthalate copolyester in which the ethylene terephthalate units comprise from 75 to 30% of the sum of the ethylene terephthalate and ethylene isophthalate units in the copolyester and the ethylene isophthalate units correspondingly comprise from 25 to 70% of said sum, said copolyester containing a coloring material.

3. A composite article comprising a linear polyester structure coated at least in a selected area with a layer comprising a random ethylene terephthalate-ethylene isophthalate copolyester in which the ethylene terephthalate units comprise from 75 to 30% of the sum of the ethylene terephthalate and ethylene isophthalate units and the ethylene isophthalate units correspondingly comprise from 25 to 70% of said sum, said copolyester containing a coloring material.

4. A composite article comprising a base of a linear polyester structure and an adhered layer comprising a random ethylene terephthalate-ethylene isophthalate copolyester in which the ethylene terephthalate units comprise from 75 to 30% of the sum of the ethylene terephthalate and ethylene isophthalate units in the copolyester and the ethylene isophthalate units correspondingly comprise from 25 to 70% of said sum, said layer containing a coloring material.

5. A composite article comprising a film base selected from the group consisting of vinyl chloride polymer films, cellophane and polyester films, and an adhered layer of a random ethylene terephthalate-ethylene isophthalate copolyester in which the ethylene terephthalate units comprise from 75 to 30% of the sum of the ethylene terephthalate and ethylene isophthalate units in the copolyester and the ethylene isophthalate units correspondingly comprise from 25 to 70% of said sum, said layer containing a coloring material.

6. The method which comprises dissolving a random ethylene terephthalate-ethylene isophthalate copolyester in which the ethylene terephthalate units comprise from 75 to 30% of the sum of the ethylene terephthalate and ethylene isophthalate units in the copolyester and the ethylene isophthalate units correspondingly comprise from 25 to 70% of said sum in a solvent for said copolyester, mixing the solution with a pigment, coating a film with the mixture and drying the composite article.

7. The method of claim 6 in which the film is polyethylene terephthalate.

8. The method of claim 6 in which the film is an ethylene terephthalate-ethylene isophthalate copolyester film in which the ethylene terephthalate units comprise from 90 to 50% of the sum of the ethylene terephthalate and ethylene isophthalate units in the copolyester and the ethylene isophthalate units correspondingly comprise from 10 to 40% of said sum.

References Cited in the file of this patent

UNITED STATES PATENTS

| | | |
|---|---|---|
| 2,691,006 | Flory | Oct. 5, 1954 |
| 2,729,620 | Sullivan | Jan. 3, 1956 |
| 2,765,251 | Williams | Oct. 2, 1956 |
| 2,893,896 | Beeber et al. | July 7, 1959 |

OTHER REFERENCES

Leffingwell et al.: American Ink Maker, August 1945, pp. 21–24.